UNITED STATES PATENT OFFICE.

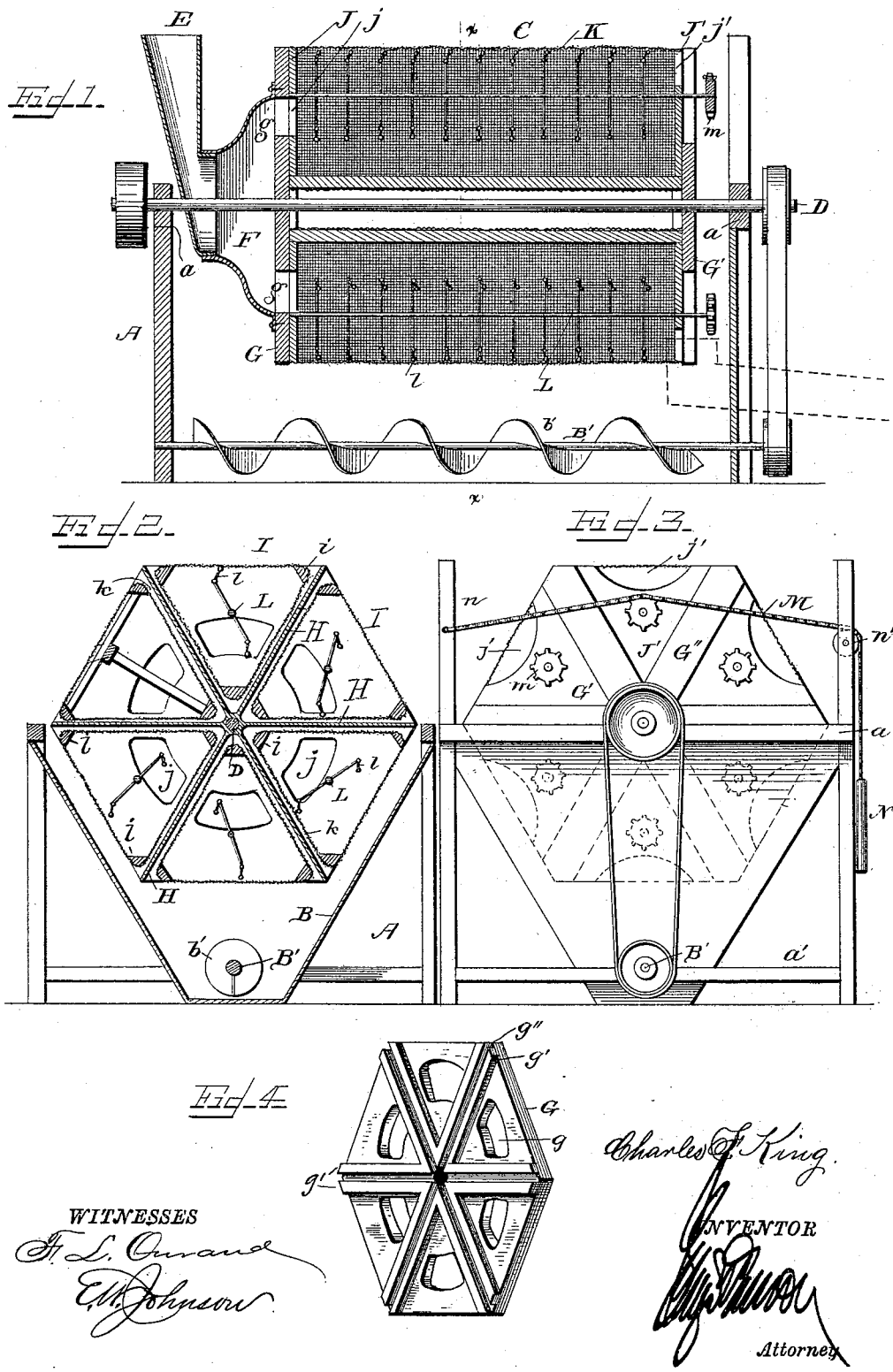

CHARLES F. KING, OF COVINGTON, PENNSYLVANIA.

BOLTING-REEL.

SPECIFICATION forming part of Letters Patent No. 332,090, dated December 8, 1885.

Application filed August 6, 1885. Serial No. 173,784. (No model.)

*To all whom it may concern:*

Be it known that I, CHARLES F. KING, a citizen of the United States of America, residing at Covington, in the county of Tioga and State of Pennsylvania, have invented certain new and useful Improvements in Bolting-Reels; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to certain new and useful improvements in bolting-reels, the object of the same being to provide a cheap and economical means for separating flour from the offal; and it consists in the construction and combination of the parts hereinafter fully set forth, and pointed out in the claims.

In the accompanying drawings, which illustrate my invention, Figure 1 is a longitudinal vertical sectional view of a bolting-reel constructed in accordance with my invention. Fig. 2 is a vertical sectional view taken through the line $x\ x$, Fig. 1. Fig. 3 is an end view; Fig. 4, a detail perspective view of one of the ends of the bolting-reel.

A represents a suitably-constructed frame, which is provided with a trough, B, above which the bolting-reel C is mounted, said bolting-reel being securely attached to a shaft, D, which is journaled to the cross-bars $a$ of the frame. To the cross-bars $a'$ of the frame A, near the bottom of the trough B, is journaled a shaft, B', which is provided with a spiral conveyer, $b'$, which carries the good or bolted flour out of said trough to a suitable receptacle, said spiral conveyer being driven by a belt which passes around a pulley located on the end of said shaft, and also around a pulley which is located on the end of the main shaft D, said shaft being driven by a suitable power.

Rigidly attached to the frame is a funnel, E, into which the unbolted flour is fed. The lower portion of this funnel is pierced by the shaft D, and around the lower end of said funnel is secured a bell-shaped receiving and distributing chamber, F, the inner periphery of which is securely attached to the head G, the opposite end rotating freely on the inturned end of the funnel E. The head G, adjacent to the periphery of the receiving and the distributing chamber, is provided with openings $g$, the ground grain being fed through these openings upon the bolting-cloths. The head G is provided with a series of strips, $g'$, which converge toward the center of said head, so as to provide recesses or grooves $g''$, within which lie the partition-boards, resting in similarly-formed grooves in the tail-board G' at the opposite end of the frame. These heads G G' are rigidly attached to the shaft D and rotate therewith, thereby carrying with said shaft the partition-boards H, which extend inwardly to the same. These partition-boards are located so as to form triangular spaces in the rotary frame, and in the accompanying drawings I have shown six such compartments, though in practice this number may be extended to twelve, or even more.

The bolting-cloths I are stretched over longitudinal bars $i$, which are rigidly attached to the heads J J', said heads resting against the head-pieces G G'. The head J is provided with openings $j$, which register with the openings $g$, and the opposite head, J', is provided with openings $j'$, which are located at the outer edge of the head-piece J', through which openings the offal passes and is delivered into a suitably-constructed trough. The triangular frames around which the bolting-cloths I are stretched rest upon the strips $g'$, so as to provide spaces $k$ between said bolting-cloths and partitions, through which the flour may pass and be delivered into the trough B.

The bolting-cloth frames are secured removably to the end pieces, G G', so that they can be readily taken from the frame when desired, and the head-piece G, instead of being solid, as shown in Fig. 4, may only consist of a frame having radiating arms, G'', as shown in Fig. 3.

The end pieces J J' of the bolting-cloth frames, as shown in Figs. 1, 2, and 3, have journaled therein shafts L, which have attached thereto a series of arms which carry at their ends balls or beaters $l$, which are flexibly connected to the ends of the arms. The shafts L are provided at their ends which extend beyond the frame with spur-wheels $m$, which engage with a chain, M, which is attached to the vertical post $n$ of the frame, and from thence passes over a pulley, n', attached to a similar post, the depending end of said chain being provided with a weight, N. When the frame is rotated, the spur-wheels m will come in contact with the chain and cause the shafts L to rotate, thereby causing the beaters l to contact with the bolting-cloth so as to separate the flour therefrom.

By the construction hereinbefore described it will be seen that the flour as it comes from the rollers or grinding-stones is fed into the receptacle F through the funnel E, and is from thence fed into the frames around which the bolting-cloth is stretched, and as said frames are rotated the flour will sift through the bolting-cloth and be delivered into the trough under the same, and from thence be conveyed to a receptacle, while the offal is discharged through the openings j' and led away, so that it can be again passed through the bolting-reel.

By making the frames for the bolting-cloth triangular in cross-section a large amount of surface through which the flour may sift is provided, and a bolting-reel when constructed in accordance with my invention will separate the flour from the offal much more rapidly and effectively than those of ordinary construction.

It will be noticed that by the construction hereinbefore described the flour in the different frames around which the bolting-cloths are stretched is agitated several times at each rotation of the reel, and that said flour will rest or fall upon different surfaces of the bolting-cloth, and that the flour, besides being sifted so as to fall directly into the trough B, will also sift upon the partition-boards H and fall through the passage-ways k into the trough, and while the reel is being rotated the shafts L will be turned intermittently, so that the beaters will remove the flour which may adhere to the cloths. It will also be noticed that these shafts L are rotated only when the triangular frames reach their highest point and when the flour settles nearest the shaft, thus leaving a larger portion of the cloth to be agitated by the knockers l.

I claim—

1. The combination, in a bolting-reel, of a series of independent bolting-frames, and devices—such as a shaft, L—passing through each, beaters l, pinions m, and chain M, for successively agitating the upper portion of each frame, substantially as set forth.

2. The combination, in a bolting-reel, of a series of bolting-frames, shafts L, provided with beaters l and passing through each frame, pinions m, chain M, and weight N, substantially as set forth.

3. The combination, in a bolting-reel, of a rotating frame comprising perforated heads and a series of bolting-frames, a circular distributing-chamber, F, adapted to revolve with said frame, a supply-funnel, stationary relative to said frame, and a shaft, L, passing through each frame, beaters l, pinions m, and chain M, for successively agitating the upper portion of each frame, substantially as set forth.

In testimony whereof I affix my signature in presence of two witnesses.

CHARLES F. KING.

Witnesses:
G. A. SPRING,
EUGENE LEE.